(12) United States Patent
Epstein

(10) Patent No.: US 11,972,253 B2
(45) Date of Patent: Apr. 30, 2024

(54) MULTI-CLOUD MACHINE-LEARNING MODEL BUILDING

(71) Applicant: NCR Voyix Corporation, Atlanta, GA (US)

(72) Inventor: Shahar Epstein, Haifa (IL)

(73) Assignee: NCR Voyix Corporation, Atlanta, GA (US)

( * ) Notice: Subject to any disclaimer, the term of this patent is extended or adjusted under 35 U.S.C. 154(b) by 92 days.

(21) Appl. No.: 17/726,097

(22) Filed: Apr. 21, 2022

(65) Prior Publication Data
US 2023/0342144 A1     Oct. 26, 2023

(51) Int. Cl.
G06F 9/44       (2018.01)
G06F 8/71       (2018.01)
G06F 9/54       (2006.01)
G06N 20/00      (2019.01)

(52) U.S. Cl.
CPC ............... G06F 8/71 (2013.01); G06F 9/547 (2013.01); G06N 20/00 (2019.01)

(58) Field of Classification Search
None
See application file for complete search history.

(56) References Cited

U.S. PATENT DOCUMENTS

| | | | | |
|---|---|---|---|---|
| 9,882,829 B2 * | 1/2018 | Maes | ............... | G06F 9/5072 |
| 10,635,437 B1 * | 4/2020 | Kunjuramanpillai | ..... | G06F 8/75 |
| 2018/0336209 A1 * | 11/2018 | Burshteyn | ............... | G06F 16/00 |
| 2021/0042645 A1 * | 2/2021 | Sharma | ............... | G06F 16/2379 |
| 2021/0398020 A1 * | 12/2021 | Ahmad | ................. | G06N 20/00 |

\* cited by examiner

*Primary Examiner* — Qamrun Nahar
(74) *Attorney, Agent, or Firm* — Schwegman Lundberg & Woessner, P.A.

(57) ABSTRACT

Machine-Learning Model (MLM) build technique is provided. Build instructions are normalized into a cloud-independent format. Each cloud identified in the instructions is assigned a specific adapter. The adapter translates the normalized format into a cloud-specific format and the adapters interact with configuration Application Programming Interfaces (APIs) of the specific cloud to process the instructions in the cloud-specific format. As the adapters interact with the corresponding APIs, output feedback from the APIs is live streamed within an interface to a developer that provided the instructions for monitoring the builds simultaneously being configured on multiple clouds. When the build instructions complete with the APIs on the clouds, the user is presented an option to initiate an orchestrator that loads, initiates, and trains the MLM as a unique instance of the MLM on each cloud.

14 Claims, 3 Drawing Sheets

MULTI-CLOUD MACHINE-LEARNING MODEL BUILDING

BACKGROUND

Development of Machine-Learning Models (MLMs) are fraught with challenges. The development steps are invoked manually by developers via a Command Line Interface (CLI) supplied by a Cloud Service Provider (CSP).

This lengthens the entire development process and makes the resulting MLM build unscalable when many development steps are needed with the build of when the same build is needed in a different configuration. For example when the same build is required for multiple different tenants, the manual development build steps must be repeated for each different tenant, such that all the steps run separately for each tenant.

Additionally, the manual build steps makes version tracking of the models more vulnerable to human errors because models are frequently updated. The dynamic nature of MLMs, especially in the retail domain, require frequent updates to the MLM (frequent deployments). Errors in model versioning within the production environment of machine-learning applications can lead to poor performance and monetary losses.

Further, the CLI is provided by the CSP, such that it likely only works with services of the same CSP. As a result, if a same MLM was to be deployed on multiple-different CSP environments (e.g., to compare performances and costs between the environments), the developers have to need to adjust the deployment method repetitively so as to adapt each build to the specific requirements of each CSP while using each CSP's CLI.

Moreover, frequently developers want to use mixed cloud services from different CSPs within a given build to improve performance and/or to save cost. Unfortunately, this is option is unavailable in the industry.

SUMMARY

In various embodiments, system and a method for multi-cloud Machine Learning Model (MLM) building are presented.

According to an aspect, a method for multi-cloud Machine Learning Model (MLM) building is presented. Input data is received from a developer for building a MLM on multiple clouds. The input data is translated into cloud-specific instructions for each different cloud. Application Programming Interfaces (APIs) of each cloud are interacted with and the corresponding cloud-specific instructions are processed through the APIs. Output feedback received from the APIs during the simultaneously interaction is streamed to an interface operated by the developer. An option is provided within the interface, which when activated by the developer within the interface causes each instance of the MLM to be initiated on each cloud.

DETAILED DESCRIPTION

Figure 1:
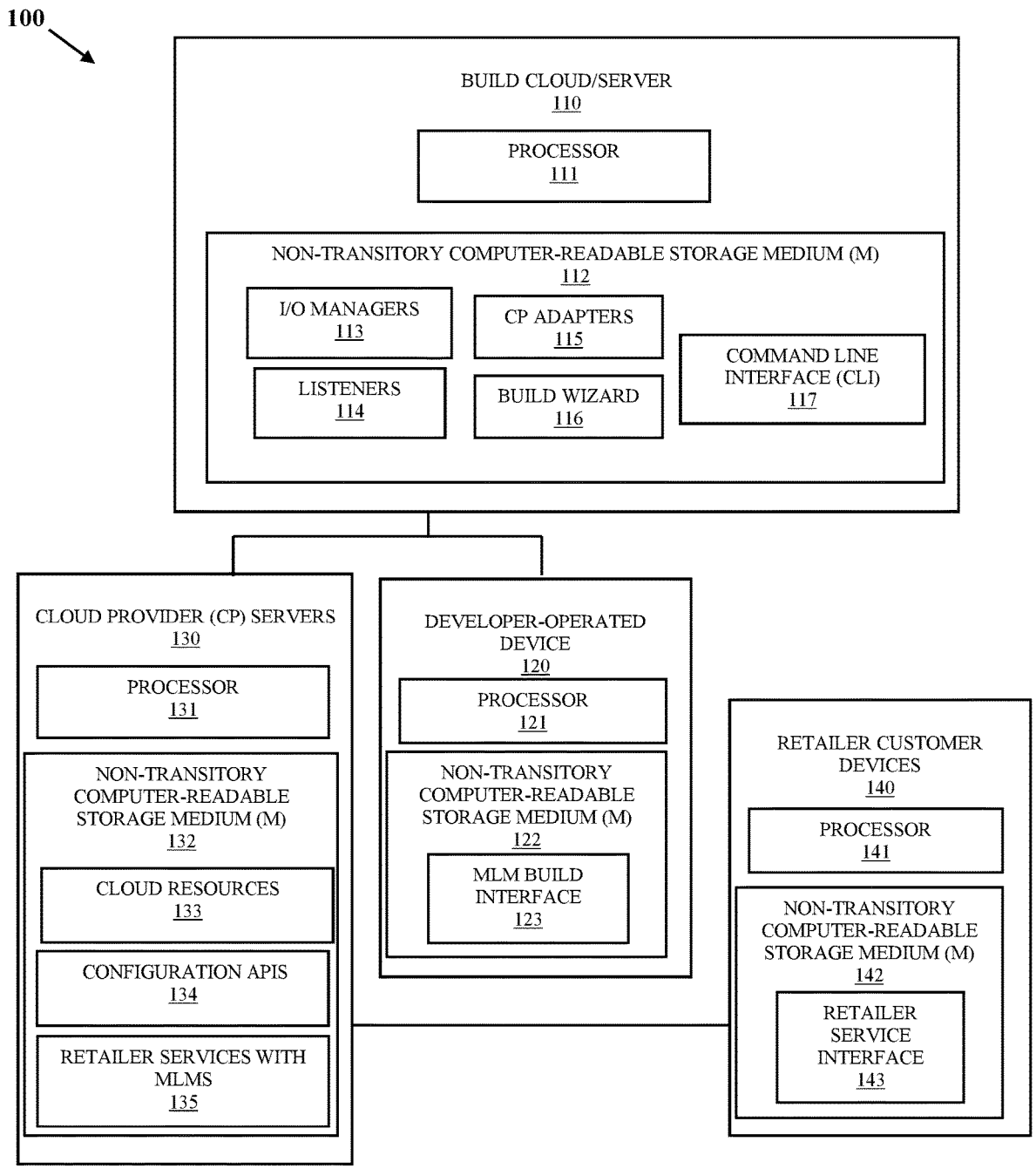
FIG. 1 is a diagram of a system for multi-cloud Machine Learning Model (MLM) building, according to an example embodiment.

FIG. 1 is a diagram of a system 100 for multi-cloud Machine Learning Model (MLM) building, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of multi-cloud Machine Learning Model (MLM) building presented herein and below.

System 100 presents a novel user-friendly Command Line Interface (CLI) that automatically deploys a Machine-Learning Model (MLM) to a single Cloud Service Provider (CSP) environment and/or multiple CSPs' environments. When starting a wizard during a MLM build, the user/developer is asked to input, one or more Cloud Provider (CP) names, a model name, a model version, a Uniform Resource Locator (URL) link to a code repository, and other information. Predefined configurations can be taken as output files from other services and used in the deployment wizard to avoid redundant user input (e.g., a cloud storage URL and cloud orchestrator URL, etc.). The technique is compatible across different CSP environments. A given MLM can be deployed to several CSP environments simultaneously. The process provides verbose user output feedback along with a current state of the build, so that the user/developer can easily identify and potential errors in the build process quickly and efficiently.

System 100 is implemented as three component pieces, I/O managers responsible for communication between the user and the CLI; adapters responsible for sending and receiving requests to and from the Application Programming Interface (API) of the CSP (each adapter responsible for interacting with a specific CSP and also can consume equivalent resource on different CSPs); and listeners responsible for communicating with the CSP and reflecting the current status of the build (development to the user/developer).

System 100 also provides live streaming of the current build status from each CP to the user. This allows the user to easily debug the build steps, since the status of each step is provided to the user in real time.

System 100 also provides automatic version tagging in a cloud repository by either creating a new tag (version) for a deployed model or by using an existing tag (existing version). This gives the user an improved version control to the deployed models and recoverability to quickly deploy a previous version if something is wrong with a current model version.

System 100 allows the deployment wizard to simultaneously deploy multiple MLMs to multiple CPs environments, such that the user can compare performances and costs between different CPs.

Essentially, system 100 permits deployment of MLMs to a single CP environment or to multiple different CPs' environments with a single development build configuration or with multiple build configurations (by running the wizard for each of the multiple build configurations, which significantly reduces the effort required).

As used herein, the terms "user," "developer," and/or "analyst," may be used interchangeably and synonymously herein and below. This refers to an individual who is operating a developer-operated device and interacting (providing input and receiving feedback) with the novel MLM build interface for purposes of configuring/building a cloud hosted or multi-cloud hosted MLM used by retailer services of a given retailer and offers to retailer customers via a retailer service interface.

The term and phrase "resource" and/or "cloud resource" refers to hardware (computing devices, memory, processor, storage, etc.) and/or software (applications, programs, functions, etc.) hosted in a cloud environment. A "service" is an organized collection of one or more resources designed to perform operations based on input data (manually supplied or automatically obtained through another service or a resource) and provide output based on the input data.

A "hosted environment," a "cloud environment," and/or a "cloud" refers to a collection of one or more hardware servers that logically cooperate as a single referenced environment over a network connection to process the resources and the services.

It is within the above-noted context that system 100 is discussed with reference to FIG. 1.

System 100 comprises a build cloud/server 110, a developer-operated device 120, a plurality of CP servers (environments) 130, and retailer customer devices 140.

Cloud/Server 100 comprises a processor 111 and a non-transitory computer-readable storage medium 112. Medium 112 comprises executable instructions for Input/Output (I/O) managers 113, a listeners 114, CP adapters 115, a build wizard 116, and a CLI 117. Processor 111 obtains or is provided the executable instructions from medium 112 causing processor 111 to perform operations discussed herein and below with respect to 113-117.

Each developer-operated device 120 comprises a processor 121 and a non-transitory computer-readable storage medium 122. Medium 112 comprises executable instructions for a MLM build interface. Processor 121 obtains or is provided the executable instructions from medium 122 causing processor 121 to perform operations discussed herein and below with respect to 123.

Each CP server 130 comprises a processor 131 and a non-transitory computer-readable storage medium 132. Medium 132 comprises executable instructions for cloud resources 133, configuration APIs 134, and retailer services with MLMs 135. Processor 131 obtains or is provided the executable instructions from medium 132 causing processor 131 to perform operations discussed herein and below with respect to 131-135.

Each retailer customer device 140 comprises a processor 141 and a non-transitory computer-readable storage medium 142. Medium 142 comprises executable instructions for a retailer service interface 143. Processor 141 obtains or is provided the executable instructions from medium 142 causing processor 141 to perform operations discussed herein and below with respect to 143.

During a development session between a developer-operated device 120 and build cloud 110, a developer interacts with build cloud 110 via MLM build interface 123 for purposes of building, configuring, and loading a MLM for use in one or more retailer services 135. Initially, MLM build interface 123 renders a single screen for access to CLI 117 from build cloud 110. The developer inputs the following data related to the MLM that is being configured or built: one or more CP names (each CP name is pre-mapped to the corresponding CP server), MLM name (name for the MLM being built and configured), MLM version, code resource repository URL (link to the CP's corresponding cloud resources 133), resource requirements (minimums and/or maximums; e.g. memory requirement, network bandwidth requirement, simultaneous network connections, etc.) by code resource name or identifier or files or file links (URLs) that define the resource requirements, etc. Use of predefined files with the resource requirements allows for more portability between CP servers 130 but the developer may also individually input resource names with resource requirements as well.

Based on the initial input data provided by the developer through the MLM build interface 123, the CLI interface 117 initiates an instance of an I/O manager 113. The instance of the I/O manager 113 normalizes the developer input into CP independent formats with generic resource names along with the resource requirements. The instance of the I/O manager 113 then initiates an instance of a specific CP adapter 115 and provides that CP adapter 115 with the developer input data in the independent format with the generic resource names and resource requirements. Each instance of a specific CP adapter 115 corresponds to a CP (CP server 130) identified by the developer in the input data.

For each instance of the CP adapter 115 and instance of a listener 114 is activated on build cloud 110. Each instance of each CP adapter 115 interacts with a specific CP server's configuration APIs 134 for purposes of processing the user input in the cloud-specific APIs 134 using the cloud-specific resources 133. Each instance of CP adapter 115 translates the independent form and generic resource names into a cloud-specific API format utilizing resources cloud-specific resource names. The format of the resources requirements for a given cloud resource may also require translation by a specific instance of the CP adapter 115.

The instances of the CP adapters 115 process the user input with each of the corresponding configuration APIs 134 for each of the corresponding cloud resources 133. Each listener monitors the API calls and API call feedback output and streams that feedback output back to the CLI 117. As the streamed feedback output is received from the interactions between the CP adapters 115 and the configuration APIs 134, CLI 117 activates build wizard 116. Build Wizard generates a split screen rendered within the MLM build interface 123, the left-side screen comprising the CLI 117, the right-side screen comprising a Graphical User Interface (GUI) that streams the feedback output from the configuration APIs 134 so that the developer can see the build processes being executed and the status in real time from all of the CP servers. Any error will be readily available with the GUI portion of the split screen in the MLM build interface 123.

When the configuration and build processing steps have completed successfully, the build wizard 116 changes the GUI portion of the spilt screen to show and option for the developer to initiate the orchestration service, which will link, initiate, and train the build on the CP servers 130.

In an embodiment, before the instances of the CP adapters 115 engage their corresponding configuration APIs 134, build wizard 116 archives the commands with the tagged version number in a versioning service, such that the build for the model can be readily obtained and automatically processed when new CPs are requested or more instances of the MLM is needed on any of the existing CPs that are running the MLM within any given retailer service 135.

System 100 presents a streamlined and portable set of interfaces (build wizard 116 and CLI 117) and processes I/O managers 113, listeners 114, and CP adapters 115 which allow a developer to build a MLM generically in a stable generic and independent format and allow the build to be processed and instantiated automatically on one or multiple different CPs (CP servers 130). The versioning is handed automatically via the build wizard 116, the translation to CP-specific configuration APIs 134 for CP-specific resources is handled by instances of specific CP adapters 115, and real-time processing feedback between the build configuration commands being executed by the configuration APIs 134 (as provided by the CP adapters 115) is lived-streamed in a split screen of the MLM build interface via a GUI (left side of the split screen comprises a rendering of the CLI 117). Once the build steps are completed, the GUI includes an orchestration option for the developer to initiate and train the MLM. Once training is complete, the MLM is available for use within its designated retailer service 135 associated to customers of the retailer using retailer service interface 143 via retailer customer devices 140.

System 100 substantially improved development of MLM builds for developers, removes redundant tasks, improves error detection during any given build, and allows a MLM build to be deployed simultaneously on multiple CP servers 130.

In an embodiment, the CLI interface 117 is rendered within the MLM build interface 123 as a GUI. In an embodiment, menu options and selection for resource names, default properties/settings, etc. can be presented as selectable options by the user during the build session through the GUI.

In an embodiment, the cloud providers can be any custom cloud provider, Microsoft® Azure®, Amazon® Web Services®, and/or Google® Cloud Platform®.

In an embodiment, the build wizard 116 may provide options within screens rendered to the MLM build interface 123 for the developer to load a previous MLM build and its settings or input data instructions, permit the developer to selectively change, delete or add settings, and automatically initiate the build processing.

The above-referenced embodiments and other embodiments are now discussed with reference to FIGS. 2-3.

Figure 2:
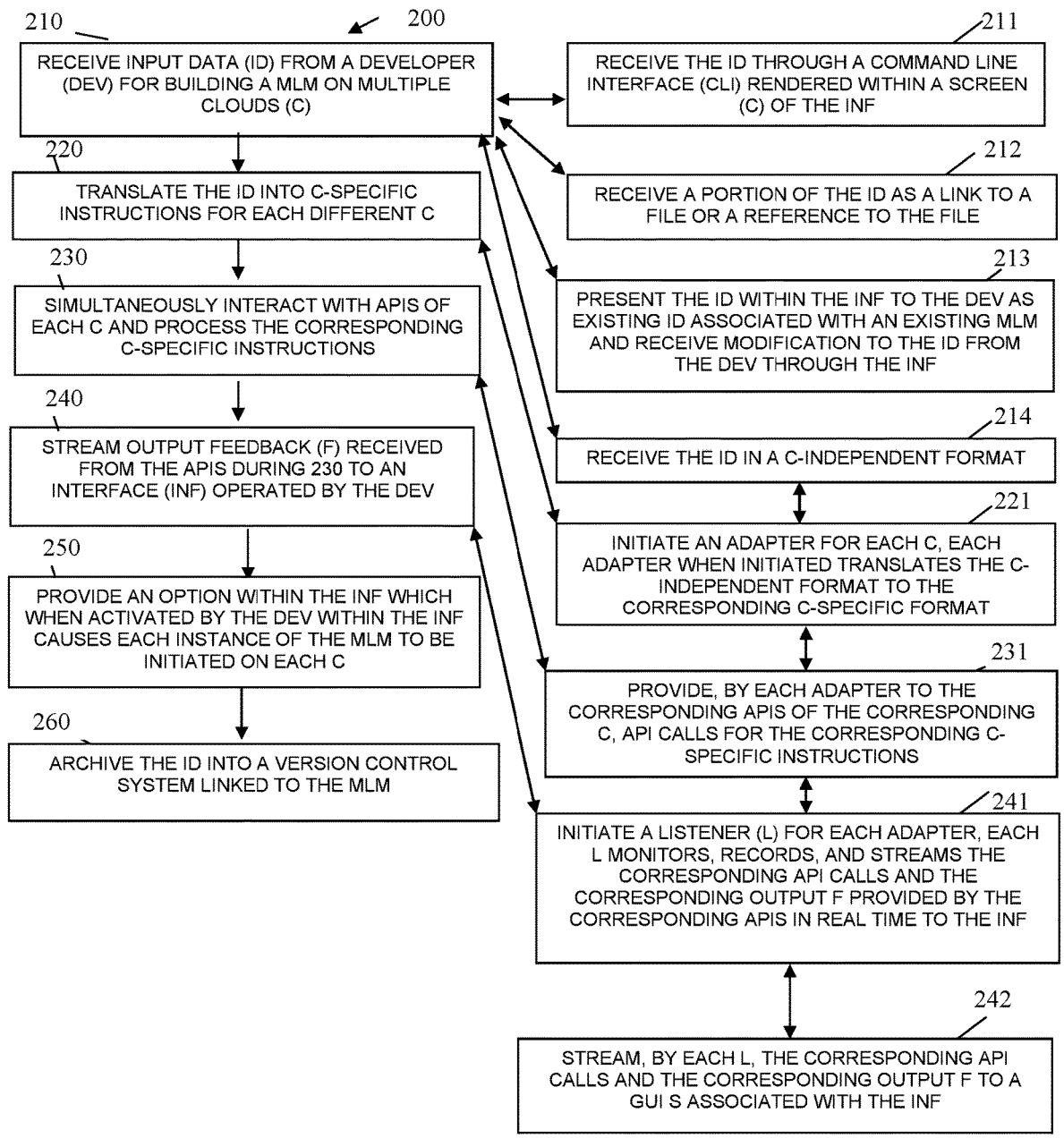
FIG. 2 is a diagram of a method for multi-cloud Machine Learning Model (MLM) building, according to an example embodiment.

FIG. 2 is a diagram of a method 200 for multi-cloud Machine Learning Model (MLM) building, according to an example embodiment. The software module(s) that implements the method 200 is referred to as a "MLM build service." The MLM build service is implemented as executable instructions programmed and residing within memory and/or a non-transitory computer-readable (processor-readable) storage medium and executed by one or more processors of one or more devices. The processor(s) of the device(s) that executes the MLM build service are specifically configured and programmed to process the MLM build service. The MLM build service has access to one or more network connections during its processing. The connections can be wired, wireless, or a combination of wired and wireless.

In an embodiment, the device that executes the MLM build service is cloud 110. In an embodiment, the device that executes MLM build service is server 110.

In an embodiment, the MLM build service is all of, or some combination of I/O managers 113, listeners 114, CP adapters 115, build wizard 116, CLI 117, and/or MLM build interface 123.

At 210, the MLM build service receives input data from a developer for building a MLM on multiple clouds. The input data comprises cloud resource configuration settings and cloud names for each of the clouds.

In an embodiment, at 211, the MLM build service receives the input data through a CLI 117 rendered within a screen of an interface 123 to the developer.

In an embodiment, at 212, the MLM build service receives a portion of the input data as a link to a file or a reference to the file. The file comprising a portion of the configuration settings and/or cloud names.

In an embodiment, at 213, the MLM build service presents the input data within the interface 123 to the developer as existing input data associated with an existing MLM. The MLM build service receives modifications to the existing input data as the input data from the developer through the interface 123.

In an embodiment, at 214, the MLM build service receives the input data in a cloud-independent, generic, or intermediary format.

At 220, the MLM build service translates the input data into cloud-specific instruction for each of the different clouds.

In an embodiment of 214 and 220, at 221, the MLM build service initiates an adapter 115 for each cloud, each adapter 115 when initiated translates the cloud-independent format to the corresponding cloud-specific format.

At 230, the MLM build service simultaneously or concurrently interacts with APIs 134 and processes the corresponding cloud-specific instructions with each cloud.

In an embodiment of 221 and 230, at 231, the MLM build service provides, via or by each adapter to the corresponding APIs 134, API calls for the corresponding cloud-specific instructions.

At 240, the MLM build service streams output feedback received from the APIs 134 during 230 to interface 123, which is being operated by the developer.

In an embodiment of 231 and 240, at 241, the MLM build service initiates a listener 114 for each adapter 115, each listener 114 monitors, records, and stream the corresponding API calls and the corresponding output feedback provided by the corresponding APIs 134 in real time to the interface 123.

In an embodiment of 241 and at 242, the MLM build service streams, by each listener 114, the corresponding API calls and the corresponding output feedback to a GUI screen associated with the interface 123.

At 250, the MLM build service provides an option within the interface 123 which when activated by the developer within the interface 123 causes each instance of the MLM to be initiated on each cloud.

Figure 3:
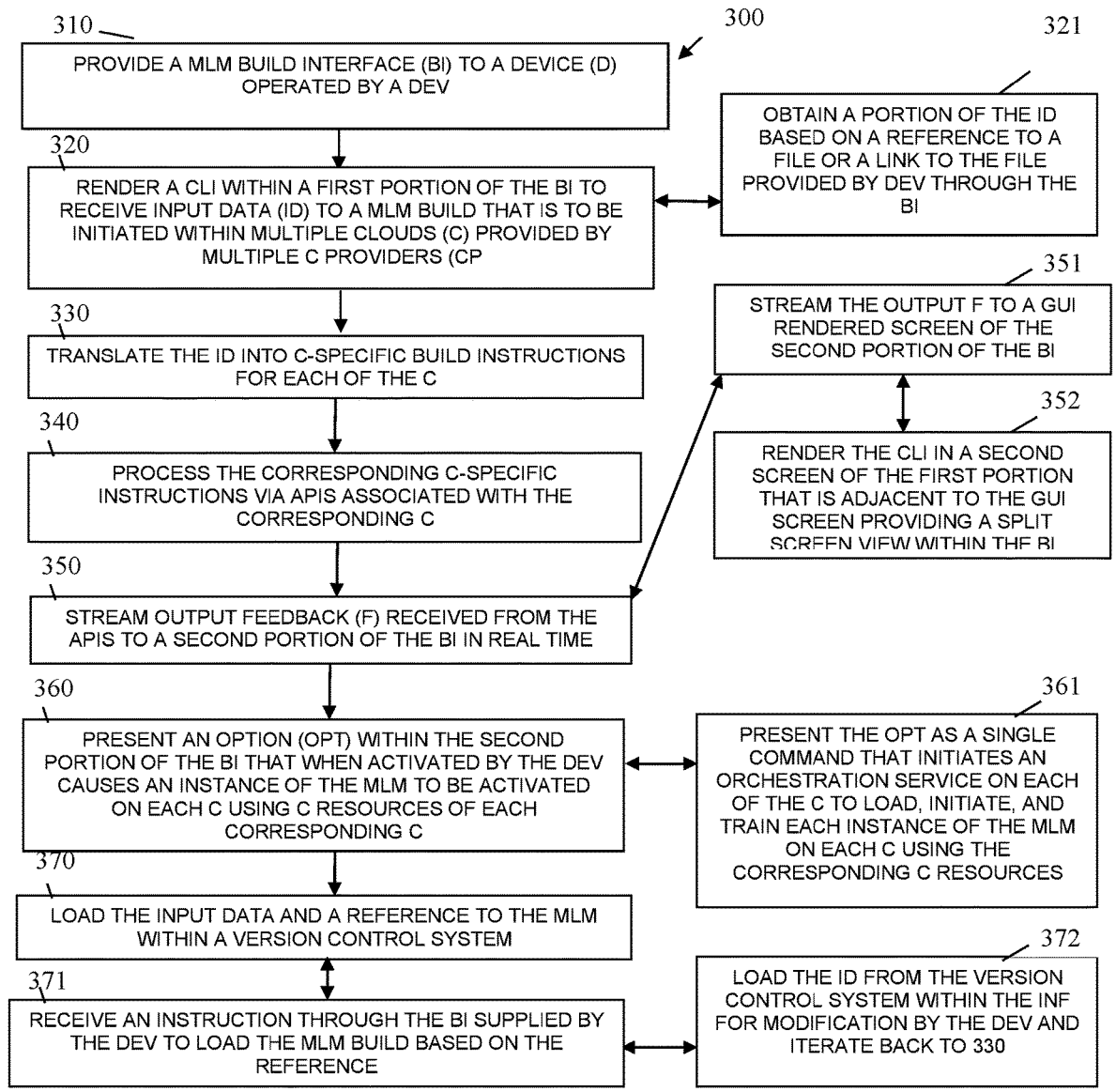
FIG. 3 is a diagram of another method for multi-cloud Machine Learning Model (MLM) building, according to an example embodiment.

FIG. 3 is a diagram of another method 300 for multi-cloud Machine Learning Model (MLM) building, according to an example embodiment. The software module(s) that implements the method 300 is referred to as a "cloud-independent MLM build wizard." The cloud-independent MLM build wizard is implemented as executable instructions programmed and residing within memory and/or a non-transitory computer-readable (processor-readable) storage medium and executed by one or more processors of one or more devices. The processor(s) of the device(s) that executes the cloud-independent MLM build wizard are specifically configured and programmed to process the cloud-independent MLM build wizard. The cloud-independent MLM build wizard has access to one or more network connections during its processing. The network connections can be wired, wireless, or a combination of wired and wireless.

In an embodiment, the device that executes the cloud-independent MLM build wizard is cloud 110. In an embodiment, the device that executes the cloud-independent MLM build wizard is server 110.

In an embodiment, the data-driven cloud-independent MLM build wizard is all of, or some combination of I/O managers 113, listeners 114, CP adapters 115, build wizard 116, CLI 117, MLM build interface 123, and/or method 200.

The cloud-independent MLM build wizard presents another and, in some ways, enhanced processing perspective from that which was discussed above with the method 200 of the FIG. 2.

At 310, the cloud-independent MLM build wizard provides a MLM build interface 123 to a device 120 operated by a developer.

At 320, the cloud-independent MLM build wizard renders a CLI within a first portion of the MLM build interface 123 to a MLM build that is being initiated within multiple clouds provided by multiple cloud providers.

In an embodiment, at 321, the cloud-independent MLM build wizard obtains a portion of the input data based on a reference to a file or a link to the file provided by the developer through the MLM build interface 123.

At 330, the cloud-independent MLM build wizard translates the input data into cloud-specific build instructions for each of the clouds.

At 340, the cloud-independent MLM build wizard processes the corresponding cloud-specific instructions via APIs 134 associated with the corresponding clouds.

At 350, the cloud-independent MLM build wizard streams output feedback received from the APIs 134 to a second portion of the MLM build interface 123 in real time.

In an embodiment, at 351, the cloud-independent MLM build wizard streams the output feedback to a GUI rendered screen of the second portion of the MLM build interface 123.

In an embodiment of 351 and at 352, the cloud-independent MLM build wizard renders the CLI 117 in a second screen of the first portion of the MLM interface 123, the first portion is adjacent to the GUI screen providing a split screen view within the MLM build interface 123.

At 360, the cloud-independent MLM build wizard presents an option within the second portion of the MLM build interface 123 that when activated by the developer causes an instance of the MLM to be activated on each of the clouds using cloud resources of each corresponding cloud.

In an embodiment, at 361, the cloud-independent MLM build wizard presents the option as a single command that initiates an orchestration service on each of the clouds to load, initiate, and train each instance of the MLM on each cloud using the corresponding cloud resources.

In an embodiment, at 370, the cloud-independent MLM build wizard loads the input data and a reference to the MLM build within a version control system.

In an embodiment of 370 and at 371, the cloud-independent MLM build wizard receives an instruction through the MLM build interface 123 supplied by the developer to load the MLM build based on the reference.

In an embodiment of 371 and at 372, the cloud-independent MLM build wizard loads the input data from the version control system within the MLM build interface 123 for modifications by the developer and iterates back to 330 with the modified input data as the input data to 330.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving input data from a developer for building a machine-learning model (MLM) on multiple clouds, wherein receiving further includes receiving the input data in a cloud-independent format;
translating the input data into cloud-specific instructions for each different cloud, wherein translating further includes initiating an adapter for each cloud, each adapter when initiated translating the cloud-independent format to the corresponding cloud-specific instructions recognized by the corresponding cloud;
simultaneously interacting with Application Programming Interfaces (APIs) of each cloud and processing the corresponding cloud-specific instructions, wherein simultaneously interacting further includes providing, by each adapter to the corresponding APIs of the corresponding cloud, API calls for the corresponding cloud-specific instructions;
streaming output feedback received from the APIs during the simultaneously interaction to an interface operated by the developer, wherein streaming further includes initiating a listener for each adapter, each listener monitors, records, and streams the corresponding API calls and the corresponding output feedback provided by the corresponding APIs in real time to the interface; and
providing an option within the interface which when activated by the developer within the interface causes each instance of the MLM to be initiated on each cloud.

2. The method of claim 1, wherein receiving further includes receiving the input data through a Command Line Interface (CLI) rendered in a screen of the interface.

3. The method of claim 1, wherein receiving further includes receiving a portion of the input data as a link to a file or a reference to the file.

4. The method of claim 1, wherein receiving further includes presenting the input data within the interface to the developer as existing input data associated with an existing MLM and receiving modifications to the input data from the developer through the interface.

5. The method of claim 1, wherein initiating the listener for each adapter further includes streaming the API calls and the output feedback to a Graphical User Interface (GUI) screen associated with the interface.

6. The method of claim 1 further comprising, archiving the input data into a version control system linked to the MLM.

7. A method, comprising:
providing a Machine-Learning Model (MLM) build interface to a device operated by a developer;
rendering a Command Line Interface (CLI) within a first portion of the MLM build interface to receive input data to a MLM build that is to be initiated within multiple clouds provided by multiple Cloud Providers (CP);
translating the input data into cloud-specific build instructions for each of the clouds;
processing the corresponding cloud-specific build instructions via Application Programming Interfaces (APIs) associated with the corresponding clouds;
streaming output feedback received from the APIs to a second portion of the MLM build interface in real time, wherein streaming further includes streaming the output feedback to a Graphical User Interface (GUI) screen rendered of the second portion of the MLM build interface;
presenting an option within the second portion of the MLM build interface that when activated by the developer causes an instance of the MLM to be activated on each cloud using cloud resources of each corresponding cloud; and
rendering the CLI in a second screen of the first portion that is adjacent to the GUI screen providing a split screen view within the MLM build interface.

8. The method of claim 7 further comprising, loading the input data and a reference to the MLM within a version control system.

9. The method of claim 8 further comprising, receiving an instruction through the MLM build interface supplied by the developer to load the MLM build based on the reference.

10. The method of claim 9 further comprising, loading the input data from the version control system within the interface for modification by the developer and iterating back to the translating.

11. The method of claim 10, wherein rendering for includes obtaining a portion of the input data based on a reference to a file or a link to the file provided through the MLM interface.

12. The method of claim 7, wherein presenting further includes presenting the option as a single command that initiates an orchestration service on each of the clouds to load, initiate, and train each instance of the MLM on each cloud using the corresponding cloud resources.

13. A system, comprising:
a cloud server comprising at least one processor and a non-transitory computer-readable storage medium;
the non-transitory computer-readable storage medium comprises executable instructions;
the executable instructions when provided to and executed by the at least one processor from the non-transitory computer-readable storage medium cause the at least one processor to perform operations comprising:
translating input data associated with building a Machine-Learning Model (MLM) into a cloud-independent format with generic cloud-resource names;
identifying from the input data in the cloud-independent format multiple clouds;
translating the cloud-independent format into Application Programming Interface (API) calls having s cloud-specific format and cloud-specific resource names for each of the clouds;
simultaneously processing the API calls with each of the clouds;
streaming output feedback received from the clouds in response to processing the API calls in real time to a developer; and
simultaneously initiating an instance of the MLM on each cloud in response to an instruction received from the developer.

14. The system of claim 13, wherein the executable instructions when provided to and executed by the at least one processor from the non-transitory computer-readable storage medium further cause the at least one processor to perform additional operations comprising:
rendering a Command Line Interface (CLI) in a first screen of a MLM build interface for receiving the input data from the developer; and
rendering a Graphical User Interface (GUI) in a second screen of the MLM build interface for streaming the output data to the developer and receiving the instruction from the developer, wherein a split screen view is presented to the developer within the MLM build interface comprising the first screen adjacent to the second screen.

* * * * *